United States Patent
Sonnerat

[11] 3,904,008
[45] Sept. 9, 1975

[54] CLUTCH RELEASE BEARING HAVING RESILIENT CENTERING AND SILENCING MEANS

[75] Inventor: Claude Sonnerat, Annecy, France

[73] Assignee: Societe Nouvelle de Roulements, Annecy, France

[22] Filed: Apr. 12, 1974

[21] Appl. No.: 460,640

[30] Foreign Application Priority Data
May 15, 1973  France............................ 73.17589
Dec. 3, 1973  France............................ 73.44668

[52] U.S. Cl. ............................................ 192/98; 308/26
[51] Int. Cl. ................................................... F16d 23/14
[58] Field of Search .................................... 192/98, 110 B

[56] References Cited
UNITED STATES PATENTS

| | | | |
|---|---|---|---|
| 2,995,406 | 8/1961 | Pitner | 192/98 X |
| 3,333,664 | 1/1967 | Chapaitis | 192/98 |
| 3,604,545 | 9/1971 | Bourgeois | 192/98 |
| 3,625,327 | 12/1971 | Birdsey | 192/98 X |
| 3,631,954 | 1/1972 | Coaley | 192/98 |
| 3,805,934 | 4/1974 | Labadie | 192/98 |

*Primary Examiner*—Benjamin W. Wyche

[57] ABSTRACT

A clutch release bearing of the type including a thrust bearing slidably mounted on a guide tube for axial movement by a clutch actuator to disengage the clutch includes centering means to permit alignment and centering of the bearing axis with the axis of the clutch despite misalignment between the axes of the guide tube and clutch. The entering means includes a resilient centering ring which encircles and slides along the guide tube, with the centering ring being designed to permit both radial and angular deflection to permit both centering and alignment of the bearing axis relative to the clutch axis. The resilient centering ring also acts as a vibration dampener to silence the clutch.

5 Claims, 9 Drawing Figures 3,904,008

CLUTCH RELEASE BEARING HAVING RESILIENT CENTERING AND SILENCING MEANS

BACKGROUND OF THE INVENTION

Field of the Invention

This invention relates to clutch bearings and more particularly to a clutch release bearing of the ball bearing type with a built-in resilient centering and silencing system.

Description of the Prior Art

It is well-known that the clutch release bearings used particularly in plate clutches in motor vehicle transmissions are formed by a bearing which acts as an axial thrust bearing on declutching, and a bearing support which also acts as a support for the fork which controls the declutching movement.

In these prior art clutch release bearings, the declutching force is transmitted to the clutch mechanism either by the outer race which comprises a radial surface which may or may not be detachable and may or may not be plane, or by the inner race which is relatively wider than the outer race and the end of which again may or may not be detachable and may or many not be plane.

If the surfaces of the clutch release bearings come into direct contact with the diaphragm of the declutching mechanism, they have a toric surface at their end and the clutch release bearings are not strictly centered on the shaft. In practice, the guide tube for the clutch release bearing and the clutch are generally not perfectly centered in relation to one another and consequently there is some slip between the clutch release bearing support surface and the declutching mechanism diaphragm, and this slip results in rapid wear of these parts.

Also, the clutch release bearing tends to try to recenter itself in relation to the diaphragm axis and this results in some knocking of the clutch release bearing bore on the guide tube and abnormal noise during operation.

The axis of the clutch and the axis of the clutch release bearing supporting guide tube may not only be off-center but also non-parallel, and this introduces additional buckling at the place of contact between the declutching diaphragm and the clutch release bearing supporting surface.

In an effort to obviate these disadvantages, it has been known that the friction and wear may be reduced by giving the declutching mechanism diaphragm a surface or heat treatment; or also the axes of the clutch release bearing end of the declutching mechanism may be recentered by providing a friction-type automatic centering mechanism for the rotating part of the clutch release bearing. However, these constructions are generally expensive and do not enable the problem to be solved completely.

SUMMARY OF THE INVENTION

The present invention relates to a clutch release bearing comprising resilient centering and silencing, and which obviates these disadvantages. According to the invention, the clutch release bearing comprises a resilient centering ring which is molded or stuck into the bore of the actuating element or into the bore of the inner race of the bearing and which enables it to be centered and to slide on the supporting guide tube.

The bore of this centering ring is generally formed with a contoured opening which gives it better resilience and which also enables it to limit friction and form a lubricant reserve.

The centering ring, which is made from a flexible material adapted to injection or compression molding, is secured to one of the elements of the clutch release bearing and its resilience enables the clutch release bearing to be recentered in respect of rotation in relation to the axis of the declutching mechanism diaphragm, and deaden or dampen the knocking of the clutch release bearing on the supporting guide tube and thus eliminate the noise produced by this.

The centering ring is such that its axial length is generally greater than that of the support on which it is fixed, thus correcting the angular gap or lack of parallelism of the axes of the clutch release bearing and of the clutch.

BRIEF DESCRIPTION OF THE DRAWINGS

Other advantages and features of the invention will be apparent from the following description of various embodiments of these clutch release bearings comprising resilient centering and silencing, which is given by way of example without limiting force with reference to the accompanying drawings wherein.

DESCRIPTION OF THE PREFERRED EMBODIMENTS

Figure 1:
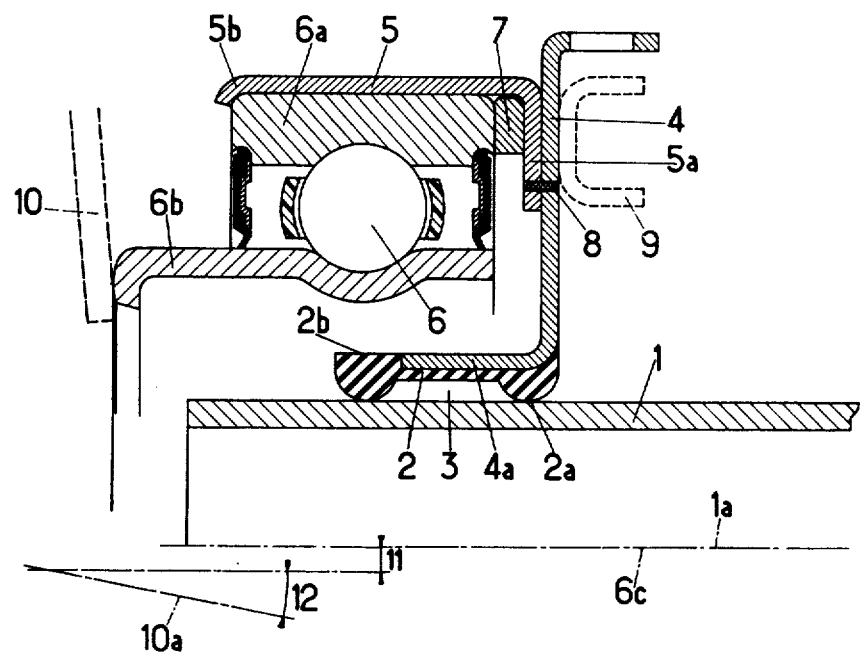
FIG. 1 is an axial half-section view of an improved clutch release bearing according to the invention and illustrating the resilient centering ring mounted in the bore of the clutch release bearing actuating element.

Referring now to the drawings in detail, a clutch release bearing according to the present invention is illustrated in FIG. 1 as being adapted to slide axially on a guide tube 1 having the axis 1a, the latter generally being off-center and non-parallel with respect to the axis of the clutch diaphragm 10a as a result of the stacking of the components on assembly, this eccentricity and misalignment being exaggerated in the drawing for purposes of illustration. The clutch release bearing is so designed that despite the off-center position of the two axes, it can operate correctly during the entire clutching operation and eliminate any noise due to the centering of the bearing on the guide tube.

The improved clutch release bearing according to the invention is mounted to be slidable on a supporting guide tube 1 having the axis 1a. The resilient centering ring 2 is formed from a resilient, flexible material adapted to injection or compression molding and has an internal cylindrical part 2a which acts as a guide and centering bushing for the bearing. The ring 2 is formed with an annular recess 3 to increase radial flexibility, limit friction and form a reserve of lubricant.

The resilient centering ring 2 may be molded directly onto the inner tubular part 4a of a rigid metal centering or actuating element 4 on which a metal casing 5 is fixed by its annular edge 5a by welding as at 8 or any other fixing means. Alternatively, the ring may be separately molded and mounted in the tubular part 4a and retained therein by suitable means such as the enlarged outer circular part 2b. A ball bearing assembly used in the embodiments of FIGS. 1 through 5 includes balls 6, an outer race 6a, and an inner race 6b. The outer race 6a is engaged, together with the spacer washer 7, in the metal casing 5 and both are locked therein by the bent-over edge 5b thereof.

The actuating element 4 also acts as a support for the fork 9 (shown in broken lines) which controls the axial movement of the bearing, on the supporting guide tube 1, in the direction of the clutch diaphragm 10 (also shown in broken lines).

On movement of the clutch release bearing, the inner race 6b of the bearing 7 axially compresses the clutch diaphragm 10 and thus results in declutching. In FIG. 1 the axis of the bearing 6c coincides with the axis of the clutch release bearing guide tube 1a. The diaphragm 10 has an axis 10a which is off-center from the axis 1a by an off-center distance 11 and in addition the axis 10a is not parallel to the axis 1a and has an annular alignment gap 12.

Figure 2:
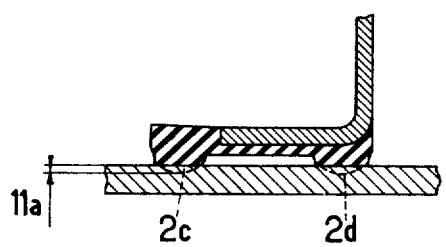
FIG. 2 is a view of a portion of the structure shown in FIG. 1 and illustrating the deformation of the resilient centering ring after centering of the clutch release bearing in relation to the clutch diaphragm.

FIG. 2 shows the axial deformation 11a of the resilient centering ring 2 as a result of compression of the parts 2c and 2d on automatic recentering of the axis 6c of the ball bearing in relation to the axis 10a of the diaphragm. The deformation 11a is of the same value as the off-center distance 11.

Figure 3:
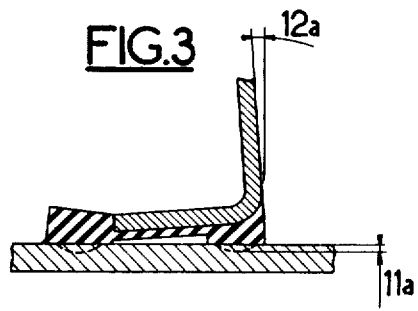
FIG. 3 is a view of the structure shown in FIG. 2 and illustrating the configuration of the resilient centering ring after centering of the bearing in relation to the diaphragm and correction of the lack of parallelism between the axes of the diaphragm and the clutch release bearing.

FIG. 3 shows the angular displacement 12a of the clutch release bearing allowed by the longitudinal deformation of the resilient centering ring on automatic realignment of the axis 6c of the ball bearing with the axis 10a of the diaphragm. The angular displacement 12a is of the same value as the angular gap 12.

To allow the longitudinal deformation, the axial length of the resilient centering ring is made greater than the axial length of the bore 4a of the actuating element 4.

The resilient centering ring, which is made of a flexible material, acts as a vibration dampener and thus eliminates any noise from the clutch release bearing knocking on its guide tube 1.

Figure 4:
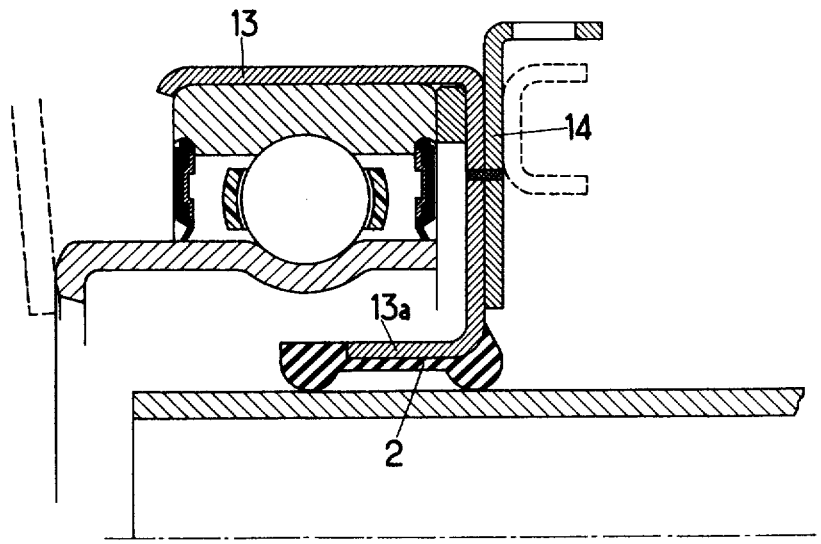
FIG. 4 is a view similar to FIG. 1 and illustrating an alternate embodiment of the clutch release bearing in which the resilient centering ring is mounted in the bore of the casing which serves as the housing for the bearing.

FIG. 4 shows a variant embodiment of the clutch release bearing according to FIG. 1. In this variant, the resilient centering ring 2 is molded or otherwise mounted onto the bore of the inner circular part 13a which forms a continuation of the rigid metal casing 13, at the center thereof, said casing 13 serving for centering and holding the outer race of the ball bearing in a fixed position. The actuating element 14 may be fixed on the rear surface of the metal casing 13 by welding, riveting or any other suitable means.

Figure 5:
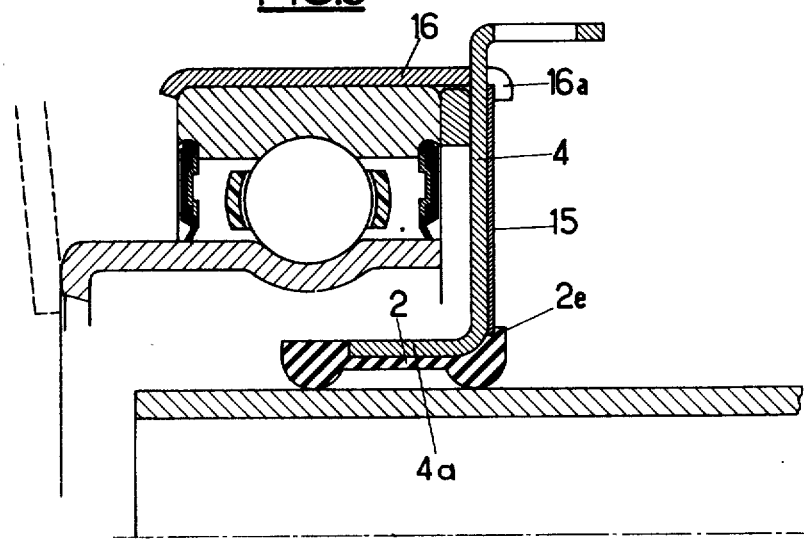
FIG. 5 is a view similar to FIG. 1 and illustrating a further variant of the clutch release bearing wherein the resilient centering ring mounted onto the actuating element enables the metal casing to be fixed differently by the addition of a wear plate.

FIG. 5 shows a variant embodiment of the clutch release bearing according to FIG. 1, wherein the resilient centering ring 2 is mounted on the inner tubular part 4a of the rigid actuating element and its outer side surface comprises a longitudinally projecting circular shoulder 2e formed with a circular groove enabling a supporting washer 15 for the fork 9 to be clipped therein. The supporting washer 15 may also be held over its outer periphery by crimping of the edges 16a of the metal casing 16, which has teeth penetrating corresponding aperatures in the actuating element 4, said crimping connecting the constituent parts of the clutch release bearing.

Figure 6:
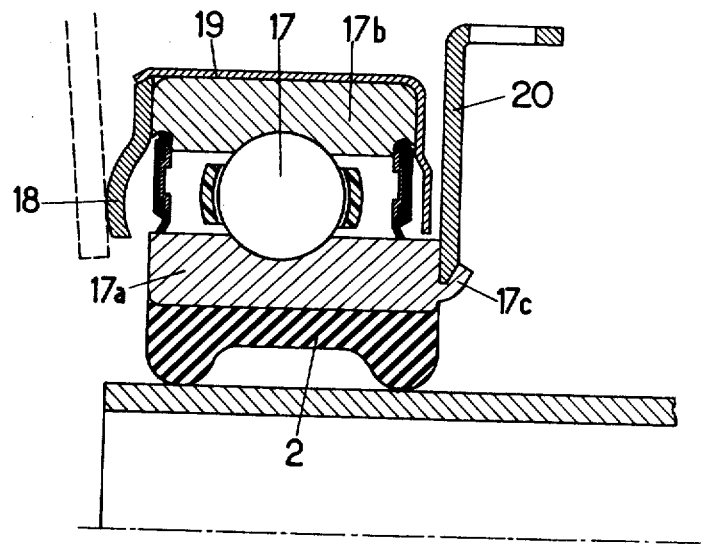
FIG. 6 is an axial half-section view of an improved clutch release bearing according to the invention wherein the resilient centering ring is mounted directly onto the inner race of the clutch release bearing.

FIG. 6 shows an improved clutch release bearing according to the present invention, wherein the resilient centering ring 2 is mounted directly into the bore of the fixed inner race 17a of the bearing 17. The rotating part of the clutch release bearing is formed by the outer race 17b, the supporting washer 18 and the metal casing 19, which interconnects the latter two elements.

The actuating element 20 is connected to the inner race 17a of the bearing 17 by crimping as illustrated at 17c or by any other suitable means.

Figure 7:
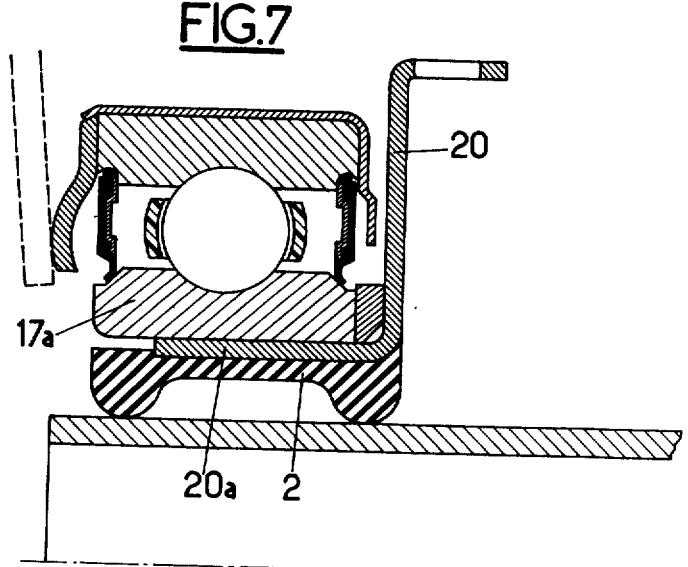
FIG. 7 is a corresponding view of a variant of the clutch release bearing according to FIG. 6, wherein the actuating element, in whose bore the resilient centering ring is mounted, is fitted directly in the bearing bore.

FIG. 7 shows a variant embodiment of the clutch release bearing according to FIG. 6 wherein the resilient centering ring is mounted into the bore of the tubular part 20a of the actuating rigid element 20, the latter being connected to the fixed inner race 17a by the said tubular part 20a being fitted into the bore of 17a.

Figure 8:
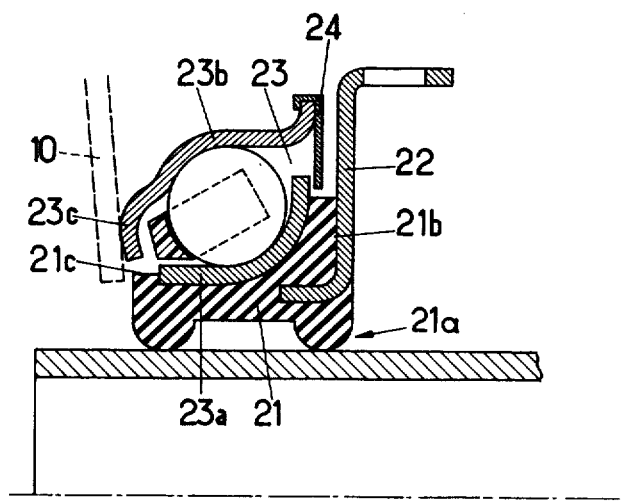
FIG. 8 is an axial helf-section view of an improved clutch release bearing according to the invention, wherein the resilient centering ring is mounted on the actuating element while the clutch release bearing is fitted in said ring.

FIG. 8 shows an improved clutch release bearing according to the invention, wherein the solid resilient centering ring 21 is mounted onto the rigid actuating element 22 and has an inner part 21a formed with an annular recess and acting as a centering and guide bushing for the clutch release bearing. Also ring 21 has a suitable profile over its outer part 21b to enable the fixed inner race 23a of the bearing to be received after complete assembly of the elements forming the bearing. The circular shoulder 21c connects the bearing 23 to the resilient centering ring 21 and a deflector 24 clamped on the rotating outer race 23b keeps the elements of the bearing 23 assembled and also enables lubricant to be retained in the bearing. The smaller diameter of the appropriate profile of the outer race 23b forms a substantially toric surface 23c which permanently bears on the diaphragm 10 of the clutch mechanism.

Figure 9:
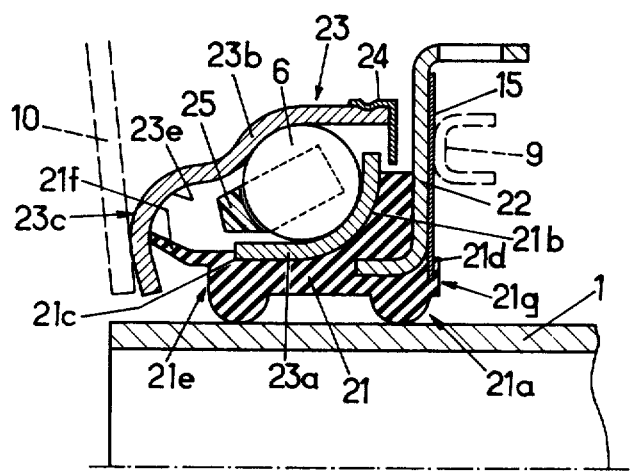
FIG. 9 is a corresponding view of a variant of the clutch release bearing according to FIG. 8, wherein the resilient centering ring enables a metal casing to be fixed by the addition of a wear plate, and provided with a lip to seal the bearing.

FIG. 9 shows a variant embodiment of the clutch release bearing according to FIG. 8. In this embodiment, the rear side surface 21g comprises a circular element 21d which projects longitudinally and is provided with a circular groove which enables the supporting washer 15 for the clutch control fork 9 to be fixed by clipping. The front side surface 21e is continued in the form of a tubular part 21f of suitable shape which comes into contact, by pressure, with the inner part of the outer race 23b of the bearing. The centering ring interposed between the inner race 23a and the rigid actuating element 22 then acts both as a vibration dampener and as a silencer with respect to the guide tube 1. The bearing elements 6 situated between the inner race 23a and the outer race 23b are held by a cage 25.

The tubular part 21f of the centering ring having the form of a circular lip which flares out and reduces in thickness at one end remains permanently in contact with the inner surface 21e of the outer ring so as to ensure sealing-tightness of the bearing by bearing on the substantially vertical inner part of the said outer race. This tubular part 21f thus avoids any entry of dust, which would have an adverse effect on proper operation of the clutch release bearing, and also prevents any escape of the lubricant required for lubricating the said clutch release bearing.

What is claimed is:

1. A clutch release bearing assembly comprising a centering and silencing ring formed from a resilient flexible material capable of being injection or compression molded, a thrust bearing having an inner race and a rotating outer race, clutch release actuating means for axially moving said thrust bearing to disengage the clutch, said centering and silencing ring being mounted on said thrust bearing for axial sliding movement on a bearing guide tube and being mounted onto said actuating means, and an annular recess formed in the inner surface of said centering ring to allow the ring to be radially and angularly deformed to permit both resilient centering and aligning of the bearing axes relative to the axis of the clutch and to substantially eliminate noise during the entire clutching operation, said recess also defining an annular lubricant reservoir between said ring and said guide tube.

2. A clutch release bearing according to claim 1 wherein said bearing actuating means is employed as a rigid centering element and wherein said resilient centering ring is mounted onto said bearing actuating means.

3. The clutch release bearing according to claim 1, further comprising a circular groove formed on said resilient centering ring, said groove providing means whereby a clutch release bearing control fork wear washer may be clipped onto said bearing assembly.

4. A clutch release bearing according to claim 3 further comprising an annular shoulder on said centering ring and connecting the bearing to said resilient centering ring mounted on said actuating means, said actuating means being a rigid centering element, and a deflector clamped on said rotating outer race.

5. A clutch release bearing according to claim 1 wherein said resilient centering ring further comprises an axially extending tubular sleeve integrally molded thereon, said sleeve comprising a circular lip coming into contact with the outer race of the bearing, said circular lip including an outwardly flared portion of reduced wall thickness adjacent its end, said outer race having a substantially radial inner part engaging said lip to seal said bearing.

* * * * *